(12) United States Patent
Kwan et al.

(10) Patent No.: US 7,742,459 B2
(45) Date of Patent: Jun. 22, 2010

(54) METHOD FOR DISTRIBUTING AGGREGATE ROUTE INFORMATION

(75) Inventors: Connie Kwan, Kanata (CA); Steve Buchko, Dunrobin (CA)

(73) Assignee: Alcatel-Lucent Canada Inc., Kanata, ON (CA)

( * ) Notice: Subject to any disclaimer, the term of this patent is extended or adjusted under 35 U.S.C. 154(b) by 2136 days.

(21) Appl. No.: 10/350,423

(22) Filed: Jan. 24, 2003

(65) Prior Publication Data

US 2003/0137974 A1  Jul. 24, 2003

Related U.S. Application Data

(60) Provisional application No. 60/352,041, filed on Jan. 24, 2002.

(51) Int. Cl.
*H04L 12/28* (2006.01)
(52) U.S. Cl. .................................................. 370/351
(58) Field of Classification Search ................ 370/352, 370/395.52, 351, 399, 401, 409, 389, 392, 370/400, 408, 235, 390, 393; 709/238, 246
See application file for complete search history.

(56) References Cited

U.S. PATENT DOCUMENTS

| 6,192,051 | B1 * | 2/2001 | Lipman et al. | 370/389 |
|---|---|---|---|---|
| 6,412,000 | B1 * | 6/2002 | Riddle et al. | 709/224 |
| 6,865,611 | B1 * | 3/2005 | Bragg | 709/238 |
| 7,139,242 | B2 * | 11/2006 | Bays | 370/238 |
| 7,139,278 | B2 * | 11/2006 | Gibson et al. | 370/401 |
| 7,254,781 | B1 * | 8/2007 | Land et al. | 715/760 |
| 2003/0021232 | A1 * | 1/2003 | Duplaix et al. | 370/238 |

\* cited by examiner

*Primary Examiner*—Chi H Pham
*Assistant Examiner*—Alexander Boakye
(74) *Attorney, Agent, or Firm*—Ross D. Snyder & Associates, Inc.

(57) ABSTRACT

A method for distributing aggregate routes that does not require a user to provision a next hop address or specify a redistribution policy is presented. Embodiments of the method utilize a modified command language interface (CLI) with a network device (e.g., router). In the various embodiments, the modified CLI is well-suited for use in routers that utilize interior gateway protocols such as open shortest path first (OSPF), routing information protocol (RIP), integrated intermediate system-to-intermediate system (ISIS), interior gateway routing protocol (IGRP), enhanced interior gateway routing protocol (EIGRP), and NetWare link services protocol (NLSP). In one or more embodiments, the invention has the advantage of providing an easier means of specifying aggregate routes, which saves user time and is less error-prone.

42 Claims, 7 Drawing Sheets

METHOD FOR DISTRIBUTING AGGREGATE ROUTE INFORMATION

This application claims priority to U.S. Provisional Patent Application No. 60/352,041, filed on Jan. 24, 2002, entitled "METHOD AND APPARATUS FOR DISTRIBUTING AGGREGATE ROUTE INFORMATION."

FIELD OF THE DISCLOSURE

The present invention relates to the field of data communication networks, and more particularly to a method and apparatus for (re)distributing aggregate route information within a data communication network.

BACKGROUND

A global computer network such as the Internet can be conceptualized as one huge network encompassing scores of smaller networks. The data transfers that take place between these scores of smaller networks are made possible through a hierarchy of communications layers utilizing a variety of communications protocols. A protocol is a set of conventions or rules that govern the transfer of data between network devices. Rudimentary protocols typically define only a hardware configuration, while protocols that are more complex define data formats, timing, error detection/correction procedures, and software structures. The seven-layer Open Systems Interconnect (OSI) Reference Model developed by the International Standards Organization (ISO), and extensively articulated in the literature, is generally used to describe the structure and function of data communications protocols. A considerable role of each layer in the OSI model is to supply services to the other layers. Connection-oriented and connectionless network services are two of the types of services provided by the OSI layers.

In a connection-oriented service, a source node creates a connection with a destination node and, after transmitting a data packet, terminates the connection. The overhead related to setting up the connection might be unappealing in the case of nodes that require very efficient communication operations. In this case, a fully connectionless service is preferable. With a connectionless service, each transmitted data packet carries the full address of its destination through the network. The destination address is used by the network layer protocols to determine the route or path of the data packet. Connectionless network services are generally implemented in network layer protocols that perform basic connectionless service, neighbor greeting, and routing functions. The basic connectionless service functions are primarily concerned with data packet formatting and end node status notification, e.g., error messages. The neighbor greeting function enables end nodes to determine which routers are available on their local network, while enabling routers to determine their end node neighbors.

A simplified example of a distributed network system is shown in FIG. 1, and is referred to as internetwork system 100. Internetwork system 100 may contain various routing domains 103, 105, and 107, which are tied to a backbone network 101. In a hierarchically arranged distributed network system 100, backbone 101 is the central connection path shared by the nodes and networks connected to it. The backbone 101 administers the bulk of traffic between communicating nodes to provide end-to-end service between one user, for example source node 122 in domain 103, and another user, for example destination node 142 in domain 107. Each routing domain 103-107 in internetwork system 100 is a collection of one or more local networks 120, 125, 130, 135, 140 that are attached to the backbone 101 through one or more routers 123, 132, and 134. In the following discussion, the term "local network" shall be used to refer to all types of networks that may be included in a domain. Routing domains 103-107 are also referred to as customer networks or autonomous systems (AS), however the term autonomous system is used more often than "routing domain" within the Internet community and in the Internet Protocol Suite, or IP. An autonomous system is a set of nodes and routers that operate under the same administration.

The networks in routing domains 103-107 may be local area networks (LAN), wide area networks (WAN), metropolitan area networks (MAN), or the like, all of which are attached to backbone 101 through routers 109, 111, and 113. A router is a specialized computer for processing IP data and forwarding IP data along respective network paths. In FIG. 1, a local network is shown as a horizontal line to which end nodes, such as node 122 on local network 120, or node 137 on local network 135, can be attached. Nodes are depicted by a circle with an 'N' within the circle, and are connected to their respective local networks. If a node is attached to the horizontal line representing a network, that node can transmit data to, and receive data from, every other node attached to the same horizontal line. Source and destination nodes are generally computer workstations and/or servers, but may be any type of device that can include a network interface card, such as a printer, modem, or facsimile machine.

The routing protocols implemented in routers 109, 111, and 113 are referred to as interdomain routing protocols, or exterior gateway protocols (EGP). One example of an exterior gateway protocol is the Border Gateway Protocol (BGP; RFC 1771), which is used to provide loop-free interdomain routing between autonomous systems. Interdomain routers 109, 111, and 113 thus encompass a higher routing level in distributed internetwork system 100. The simplified example of FIG. 1 does not show more than one interdomain router connecting each domain 103-107 to backbone 101, however, it should be noted that oftentimes more than one interdomain router is used to connect domains to the backbone, for purposes of redundancy.

The routing protocols implemented in routers 123, 132, and 134 are referred to as intradomain routing protocols, or interior gateway protocols (IGP). Examples of an interior gateway protocol are routing information protocol (RIP), open shortest path first (OSPF), and NetWare link services protocol (NLSP; from Novell, Inc.), among various others. Intradomain routers 123, 132, and 134 encompass a lower routing level in distributed internetwork system 100, and are tasked with managing communications between local networks and nodes within their respective domains 103-107. The interdomain routers manage all of the intradomain routers without addressing details internal to lower routing levels. Communications amongst these routers generally comprises an exchange (i.e., an advertising) of routing information. This exchange occurs between routers at the same routing level (peer routers), as well as between routers at different routing levels.

Although the majority of Internet users have never seen a router, the functions performed by this specialized computer are largely responsible for allowing the Internet (or any other large internetwork such as hierarchically arranged distributed network system 100) to exist. Routing and the information routers exchange may be considered the "glue" that binds distributed networks together. Without routers and routing, IP traffic would be limited to a single physical network. IP routing specifies that IP packets (datagrams) travel through internetworks one hop at a time (next hop routing) based on the destination address in the IP header. The entire route is not known at the outset of the journey. Instead, at each stop, the next router or destination end node (referred to as the next hop) is calculated by matching the destination address within the datagram's IP header with an entry in the current node's (typically, but not always, a router) routing table. Alternately, a route policy may be used instead of routing table entries to derive the next hop address. As more nodes are added to an IP network, the amount of routing information that must be shared (exchanged) between routers increases, as does the size of the routers' configuration or routing tables. A routing or configuration table is a collection of information that a router uses to decide where a packet should go (which network path to take), and includes information such as which connections lead to a particular address, priorities for connections to be used, and rules to use for handling routine and special cases of packet traffic, etc.

A network with a limited number of gateways to other TCP/IP networks can be configured with static routing. A static routing table is constructed manually by the network administrator using the ip route command via a command language interface (CLI) to the router(s). Static routing tables do not adjust to network topology changes, so static routing tables should only be used where the topology seldom changes. In the case where remote destinations can only be reached through one route, however, a static route is generally the best routing choice. When there is more than one possible route to the same destination, dynamic routing is recommended. A dynamic routing table is constructed from the information exchanged by routing protocols, which are designed to distribute information that dynamically adjusts routes to reflect changing network topology conditions. Routing protocols can manage complex routing situations more efficiently and accurately than the network administrator can.

Improvements in router processing power and in the development of routing protocols and other techniques such as aggregation of routes have been used to reduce the amount of routing information that needs to be shared between routers. Aggregation is the process of combining several different routes in such a way that a single route can be advertised. For example, an aggregate route can be considered a route in which only an IP subnet address for each route needs to be considered for routing purposes. Advertising an aggregate route means exchanging or providing information about the aggregate route to other routers. Aggregation serves the purpose of minimizing the size of routing tables used to store advertised IP routes. This concept is demonstrated in FIG. 2, which shows a simple aggregate route being advertised from one router to another router.

In FIG. 2, router B 215, shares routing information with another router A 210, in the form of an autonomous system (AS) external link state advertisement (LSA) message 220. Thus router B 215 is utilizing a link-state protocol, in the example presented, OSPF, in which a link can be considered as being an interface on router B 215. The state of the link is a description of that interface, and of its relationship to its neighboring routers, such as router A 210. A description of the interface could include, for example, the IP address of the interface, the mask, the type of network it is connected to, the routers connected to that network, and the like. The compilation of all these link-states forms a link-state database (not illustrated).

LSA message 220 contains the IP address of an aggregate route, i.e., 1.1.0.0/16. In the example of FIG. 2, the aggregate route information provided by server B 215 is obtained from server B's 215 access to three separate servers, server 217, server 218, and server 219, at IP addresses 1.1.1.1, 1.1.2.2, and 1.1.3.3, respectively.

The various types of routers follow routing models, e.g., GateD derivations or RouteD derivations, and each routing protocol can be a source of information. That routing information can be subjected to import policies, which affect whether or not the information will enter the Routing Information Base (RIB). Import policies may not be applied to routes representing directly connected interfaces, static routes, and aggregate routes. These directly connected interfaces, static routes, and aggregate routes will be in the RIB for as long as they are valid. The RIB contains all routes that are valid and are not rejected by an import policy. Typically, the RIB contains multiple routes to the same prefix (e.g., the number of leading bits in an IP address which represents the net number portion of the IP address, for example, the IP address bits common to the IP addresses occurring within a subnet), but from different protocol sources.

In the case of multiple routes to the same prefix, the router needs to decide which source (of the same information) will be considered more "trustworthy" than others will, that is, there is a measure of preference between different routing protocols. Each routing protocol is assigned a default preference value, which can be modified when configuring a router. The route selection process, with the help of route preference, chooses the active routes from the RIB, and copies them into the Forwarding Information Base (FIB). The FIB is used for packet forwarding, and contains straightforward mapping between prefixes and next hops to be used for those prefixes.

Export policies can be applied to the active routes in the FIB to control which of those will be exported (distributed, or in the vernacular of the art, redistributed) to other routing protocols. Unlike import policies, export policies can be applied to prefixes from any source, including connected, static, and aggregate routes. Redistribution can be considered a "shortcut" means of configuring an export policy. As an export policy, redistribution takes active routes from the RIB that originate from a given source protocol, and advertises them to a target protocol.

FIG. 3 is a simplified diagram showing the generation of an autonomous system (AS) external link state advertisement (LSA) message such as AS external LSA message 220 discussed in FIG. 2. The generation of external LSA message 220 involves a configuration interface 310 such as command language interface (CLI) within router B 215. A user, e.g., network operator, system administrator, etc., inputs the various commands into a console 315, typically via a keyboard, which console 315 transmits to the CLI configuration interface 310. The CLI configuration interface 310 then instructs an open shortest path first (OSPF) routing protocol process 305 running on router B 215 to generate the message according to the received input from user at console 315. The commands input in the example of FIG. 3 are shown in sample input commands area 316.

In the example of FIG. 3, operator sample input commands 316 are provided for distributing three aggregate routes, IP route 1.1.0.0/16, IP route 2.2.0.0/16, and IP route 3.3.0.0/16. Each of the aggregate routes also requires the operator to provide a next-hop address 320 in the input commands 316 for the respective aggregate routes. In FIG. 3, for example, the next-hop address 320 of 1.1.1.1 is provided by the user for aggregate route 1.1.0.0/16, the next-hop address 320 of 2.2.1.0 if provided by the user for aggregate route 2.2.0.0/16, and the next hop address 320 of 3.3.1.2 is provided by the user for aggregate route 3.3.0.0/16. A next hop address 320 is an address of one of the devices accessible by the aggregate route. Each aggregate route must have a next hop address such as 320 that is reachable through Router B 215. For example, in the simple model illustrated in FIG. 2, the aggregate route 1.1.0.0/16 could specify a next hop address of 1.1.1.1, or 1.1.2.2, or 1.1.3.3—only one next hop address is required even though an IP subnet (i.e., 1.1.0.0/16) can be reached through three different device addresses.

The aggregate routes must be added as static routes and then redistributed into OSPF 305. When route redistribution is invoked, all static routes in Router B 215 are redistributed over to Router B's 215 neighbors. A redistribution policy 330 must be used to filter out all unwanted static routes from being redistributed into OSPF 305. To this end, the user creates a route map which specifies a redistribution policy 330 required by the redistribute static command, as is illustrated in an exemplary manner in the commands area 316. The route map is a means of controlling the (re)distribution of routes between routing domains. The syntax and/or purpose of these various commands are well-known in the art, and will therefore not be discussed in detail.

One problem with the prior art such as the example presented in FIG. 3 is that each static route representing an aggregate route requires a user to provide a next hop address in the CLI/router configuration process. As previously stated, however, a next hop address is only one of the device addresses reachable via the aggregate route. However, should the device specified as the next hop address become unavailable, i.e., be out of service for whatever reason, the entire aggregate route is adversely affected. For example, if the next hop address 320 of 1.1.1.1 is out of service, the static route with IP subnet 1.1.0.0/16 is no longer reachable because it does not have a reachable next hop address 320. This static route would be removed from the routing table in Router B 215, and OSPF 305 in Router B 215 would send another AS external LSA message 220 informing its neighbors that 1.1.0.0/16 is no longer reachable, even if numerous other devices are still in service with addresses within IP subnet 1.1.0.0/16, i.e., 1.1.2.2, or 1.1.3.3, etc. No other routers in the network know about 1.1.2.2 and 1.1.3.3 because the subnet address 1.1.0.0/16 is no longer advertised by Router B 215 should the specified next hop address 320 go out of service. That is, advertisement of the aggregate route to other routers will be suspended for as long as the unavailability of the device specified as the next hop address persists, thereby rendering other devices subtending from the aggregate route unreachable, and potentially disrupting a large portion of the routes in a segment or segments of IP networks.

Another problem with the prior art as regards a user having to manually provision a next hop address is the amount of time often required of a user to do so, which can be considerable in the case of numerous entries. In addition, there is a possibility of the user inadvertently introducing errors when entering the next-hop address via the CLI, e.g., entering x.z.x.x instead of x.x.x.x for the next-hop address. Correction of entry errors is also time consuming, and may render portions of a network unreachable until the entry error is corrected.

Therefore, what is needed is a method for distributing aggregate routes that overcomes the problems inherent when a user must manually provision a next hop address.

BRIEF DESCRIPTION OF THE DRAWINGS

Other objects, advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE FIGURES

A method and apparatus for distributing aggregate route information is described. In accordance with at least one embodiment of the invention, a user is not required to provision a next-hop address or specify a redistribution policy for an aggregate route. Various embodiments of the method and apparatus utilize a modified command language interface (CLI) with a network device (e.g., router). In the various embodiments, the modified CLI is well-suited for use in routers that utilize interior gateway protocols such as open shortest path first (OSPF), routing information protocol (RIP), integrated intermediate system-to-intermediate system (ISIS), interior gateway routing protocol (IGRP), enhanced interior gateway routing protocol (EIGRP), and NetWare link services protocol (NLSP). In one or more embodiments, the invention has the advantage of providing an easier means of specifying aggregate routes, which saves user time and is less error-prone.

Figure 4:
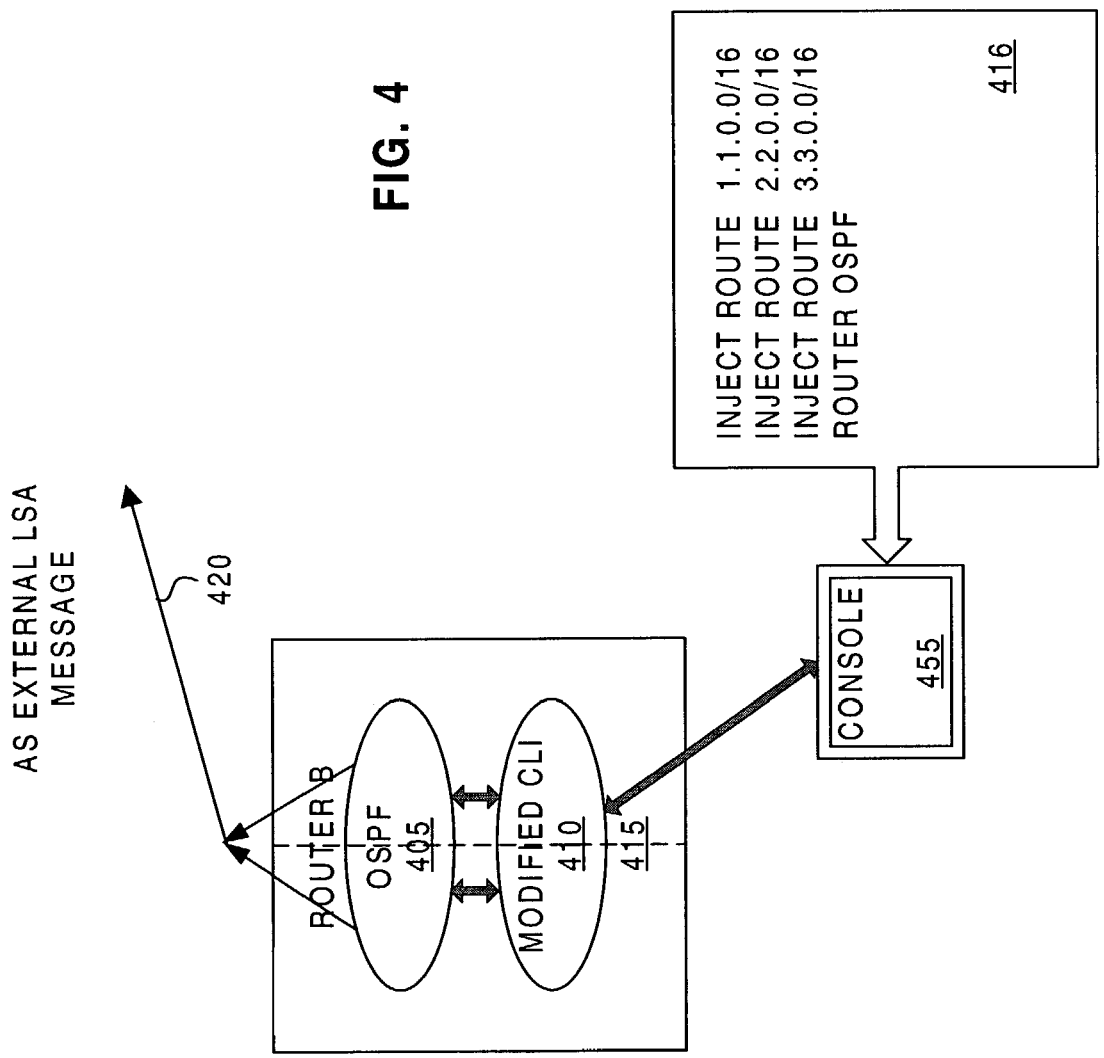
FIG. 4 is a simplified block diagram showing a technique for the generation of an external link state advertisement (LSA) message for distributing routing information on an aggregate route via the OSPF protocol according to at least one embodiment of the present invention.
Figure 5:
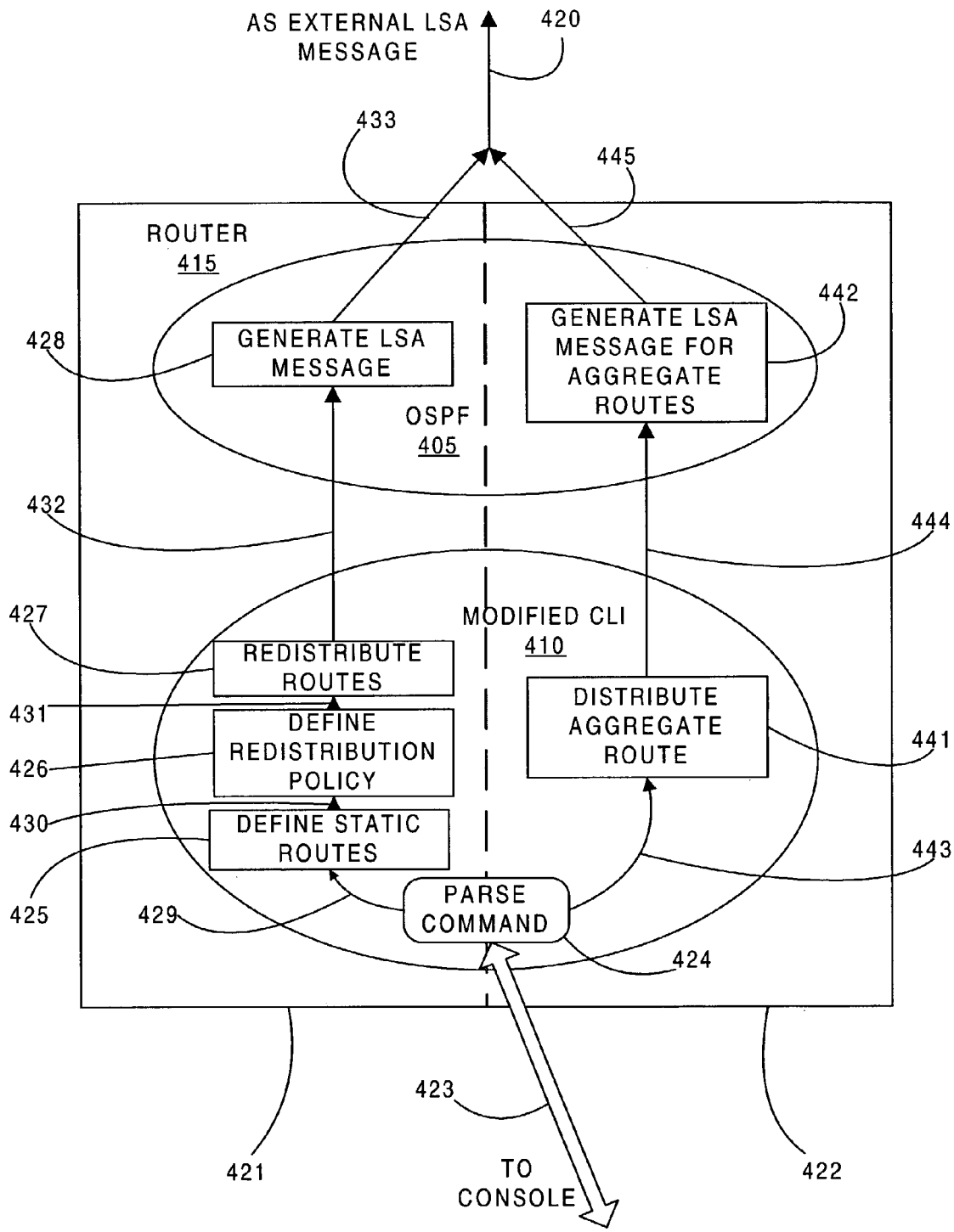
FIG. 5 is a block diagram illustrating a technique for generation of an external LSA message for distributing routing information in accordance with at least one embodiment of the present invention.

FIGS. 4 and 5 illustrate a method for distributing aggregate routes that does not require a user to provision a next hop address. More particularly, the method as disclosed is well-suited for implementation with network devices (e.g., routers) that utilize interior gateway protocols such as open shortest path first (OSPF), routing information protocol (RIP), integrated intermediate system-to-intermediate system (ISIS), interior gateway routing protocol (IGRP), enhanced interior gateway routing protocol (EIGRP), and Novell Inc.'s NetWare link services protocol (NLSP). In one or more embodiments, the invention has the advantage of providing an easier means of specifying aggregate routes, which saves user time and is less error-prone.

Figure 1:
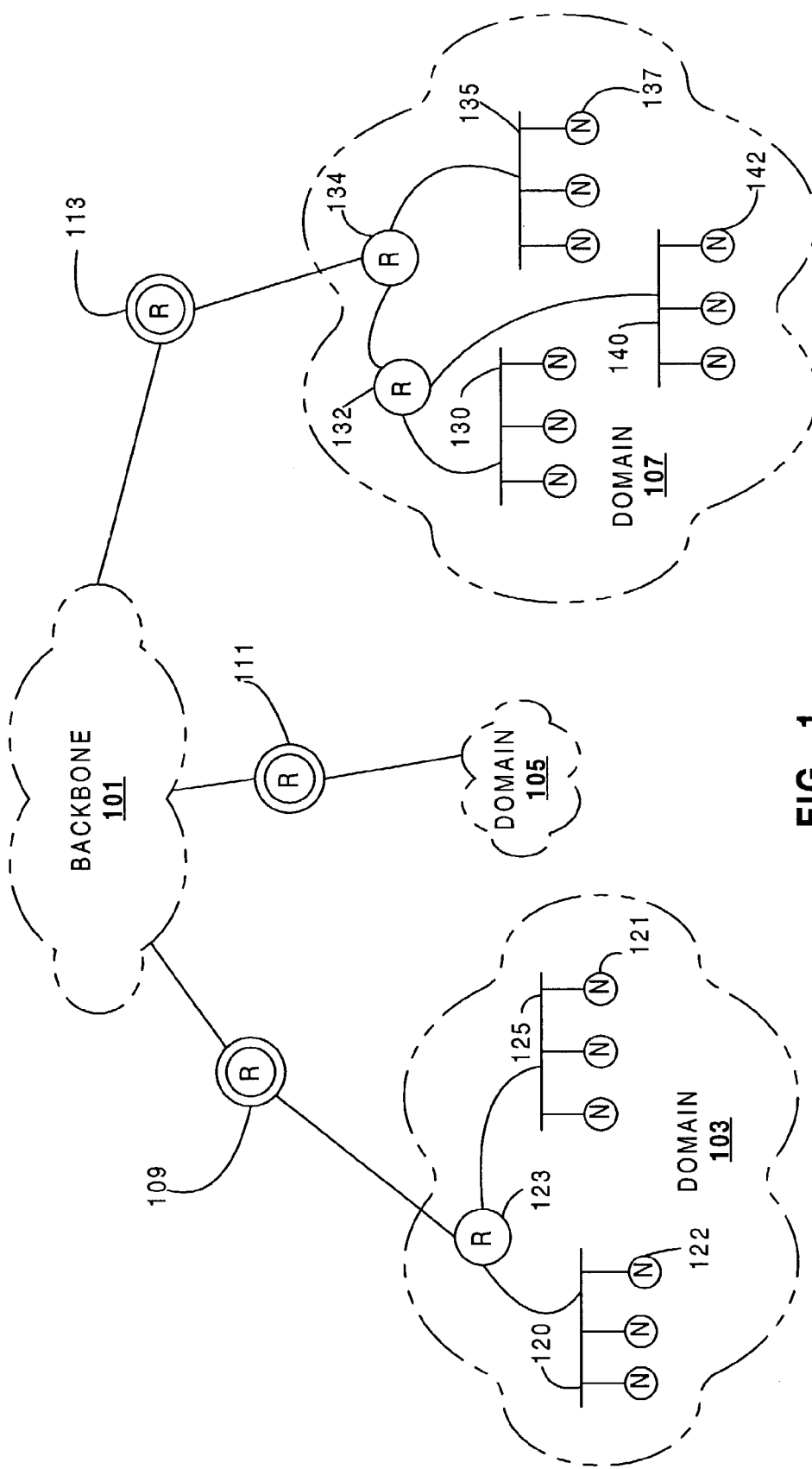
FIG. 1 is a simplified diagram of a distributed network system (internetwork) including a collection of domains with one or more networks to illustrate the function of routers and routing protocols within an internetwork.
Figure 2:
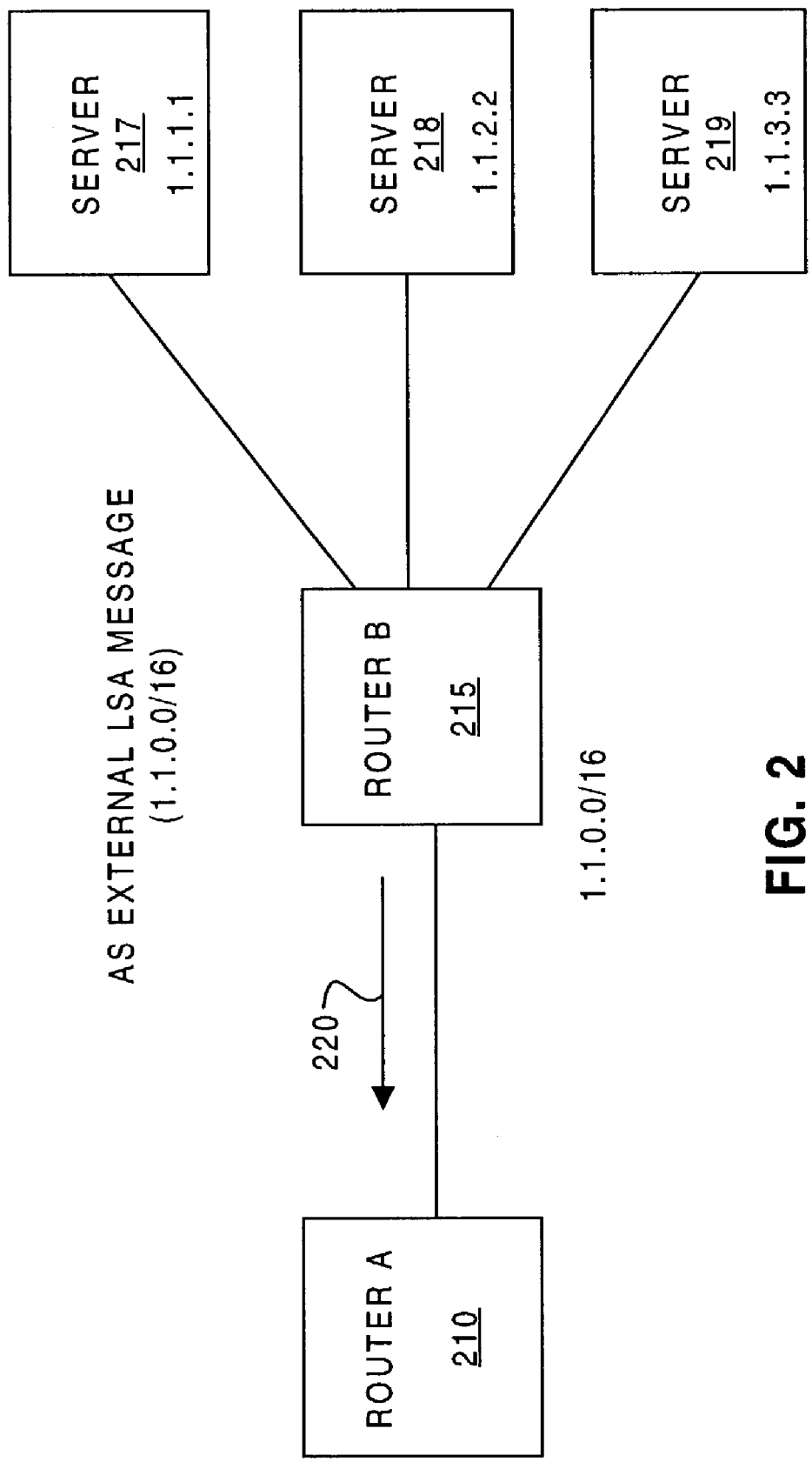
FIG. 2 is a simplified block diagram showing a simple aggregate route being advertised from one router to another router.
Figure 3:
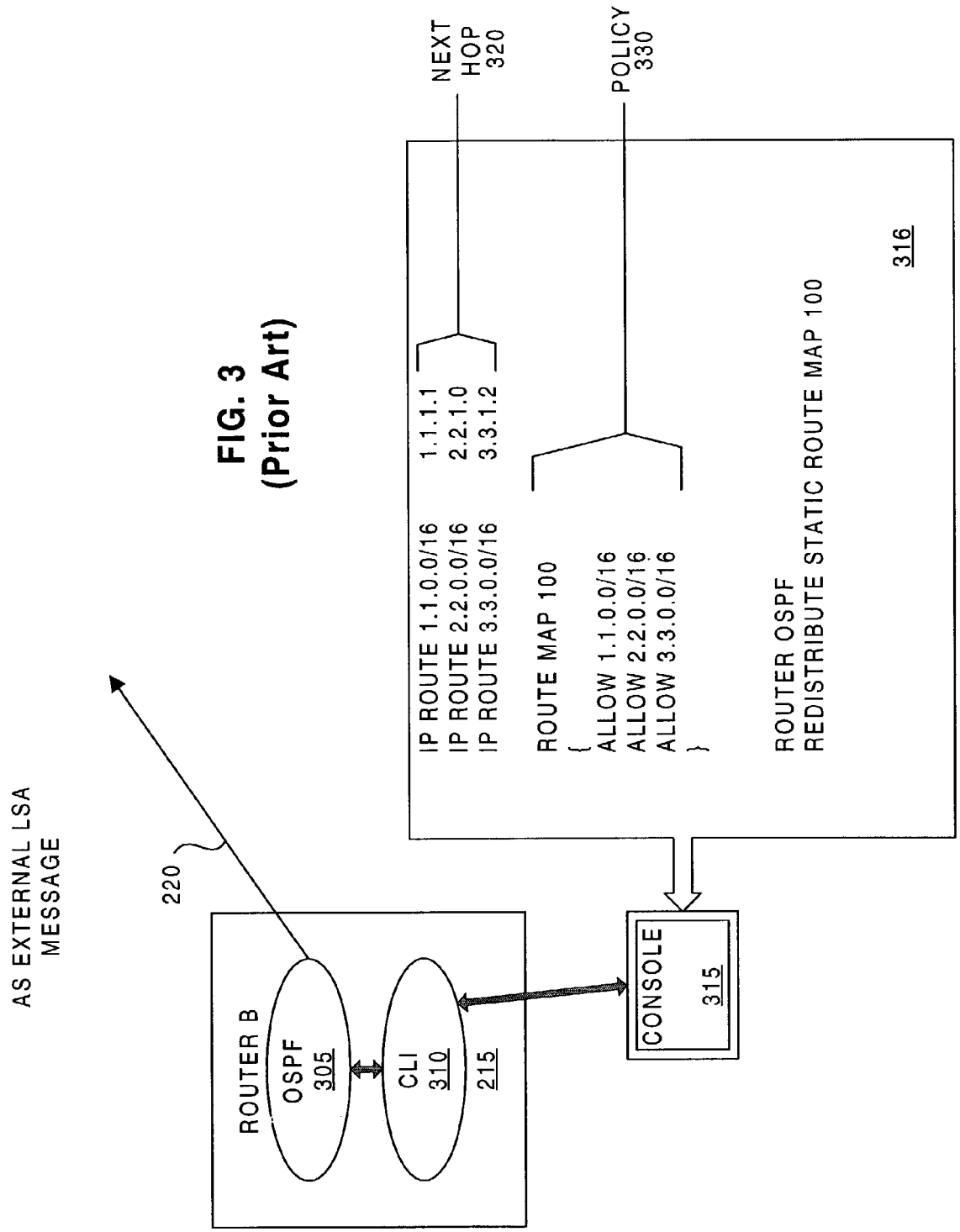
FIG. 3 is a simplified diagram showing the generation of an external link state advertisement (LSA) message for distributing routing information on an aggregate route via a routing protocol.

FIG. 4 is a simplified block diagram showing a technique for generation of an external link state advertisement (LSA)

message for distributing routing information on an aggregate route via the OSPF protocol according to at least one embodiment of the present invention. In FIG. 4, a modified version of the command language interface (CLI) 410 in a router advertising an aggregate route is provided in the router B 415. The modified CLI 410 accepts a new command, "inject route," entered by a user via console 455. A determination of the number of prefix bits in an IP address of the aggregate route is made, wherein the prefix bits are bits having values in common with all IP addresses of devices accessible via the aggregate route to be advertised on Router B 415. In the sample command inputs 416, only the IP address of the aggregate route(s) and the number of prefix bits to a router coupled to one end of the aggregate route and between the aggregate route and the device, e.g., router B 415 with modified CLI 410, need be provided. For example, in the sample command inputs area 416, we see that only the commands "inject route 1.1.0.0/16", "inject route 2.2.0.0/16", and "inject route 3.3.0.0/16" are needed. After specifying the routing protocol process to be used in command area 416 ("Router OSPF", in our example), the modified CLI configuration interface 410 then instructs an open shortest path first (OSPF) routing protocol process 405 running on router B 415 to generate the AS external LSA message 420 according to the configuration commands entered by the user at console 455. This is unlike the previous example shown in FIG. 3, where a next hop address 320 was required to be input by the operator. In the various embodiments of the present invention, no next hop address is required to be input by the operator when utilizing the "inject route" command with modified CLI 410 in Router B 415, all that is required is an aggregate route IP address.

Furthermore, the "inject route" command of modified CLI 410, once configured in Router B 415, initiates distribution of the aggregate route by Router B 415. Router B 415 generates an AS external LSA message 420, which is sent to Router B's 415 neighboring routers. In the example shown in FIG. 4, in AS external LSA message 420, Router B 415 informs its neighbors that aggregate routes 1.1.0.0/16, 2.2.0.0/16 and 3.3.0.0/16 are reachable through Router B 415. In the various embodiments disclosed herein, no route redistribution is needed, and no extra routes are redistributed into OSPF routing protocol process 405. Hence, the present invention has no need for a redistribution policy. Recall that in the prior art illustrated in FIG. 3, a redistribution policy 330 was required, and was provided by the route map. By eliminating the requirement of specifying a next hop address, the present invention removes the dependence of the aggregate route on the next hop device. Even though one of Router B's 415 devices (e.g., 1.1.1.1) in the 1.1.0.0/16 subnet may be out of service, the "inject route" configured by modified CLI 410 would still continue to be advertised through Router B 415 since there is no next hop address that is associated with any of the subnet's devices. Thus other devices on the subnet 1.1.0.0/16 could still be reached through Router B 415.

FIG. 5 is a block diagram illustrating a technique for generation of an external LSA message for distributing routing information in accordance with at least one embodiment of the present invention. Router B 415 can accommodate distribution of aggregate route information in a manner affording the beneficial features described herein and can optionally support distribution of aggregate route information or direct route information in a manner as heretofore provided. The former is illustrated in a block subdiagram in region 422 of Router B 415, while the latter is illustrated in a block subdiagram in region 421 of Router B 415. As noted above, Router B 415 comprises modified CLI 410 and OSPF routing protocol process 405. When a command is received from console 455 along path 423, the command is parsed at block 424. At block 424, a determination is made as to whether to process the command according to the blocks within region 421 or region 422. For example, commands relating to the distribution of aggregate routes are preferably processed according to the blocks within region 422, while commands relating to either direct or aggregate routes may be processed according to the blocks within region 421.

The portion of modified CLI 410 within region 422 comprises block 441, while the portion of OSPF routing protocol process 405 within region 422 comprises block 442. Block 424 is linked to block 441 via path 443, while block 441 is linked to block 442 via path 444, and block 442 is linked to path 446 via path 445. Thus, to process a command according to the blocks within region 422, an aggregate route is distributed in block 441, and an AS external LSA message is generated for the aggregate route in block 442.

The portion of modified CLI 410 within region 421 comprises blocks 425, 426, and 427, while the portion of OSPF routing protocol process 405 within region 421 comprises block 428. Block 424 is linked to block 425 via path 429, while block 425 is linked to block 426 via path 430, and block 426 is linked to block 427 via path 431. Block 427 is linked to block 428 via path 432, and block 428 is linked to path 446 via path 433. Thus, to process a command according to the blocks within region 421, a static route is defined in block 425, a redistribution policy is defined in block 426, routes are redistributed in block 427, and an AS external LSA message is generated in block 428.

Note that although the examples presented in FIGS. 4 and 5 indicate that the OSPF routing protocol process 405 is used, other interior gateway protocols such as routing information protocol (RIP), integrated intermediate system-to-intermediate system (ISIS), interior gateway routing protocol (IGRP), enhanced interior gateway routing protocol (EIGRP), and NetWare link services protocol (NLSP) can be used to practice the teachings disclosed herein. For example, if the modified CLI configuration interface 410 were employed in a router utilizing ISIS or RIP as the routing protocol, the input command would be "router ISIS" or "router RIP" instead of the "router OSPF" command shown in input command area 416. Accordingly, the CLI 410 would provide the IP address and the number of prefix bits to an ISIS routing protocol, or to a RIP routing protocol, with the "inject route" command. In the case of ISIS, a link-state packet (LSP) transmission advertising the aggregate route would be generated instead of the OSPF external LSA message 420. In the case of RIP, an updated UDP datagram would be generated to advertise the aggregate route.

Figure 6:
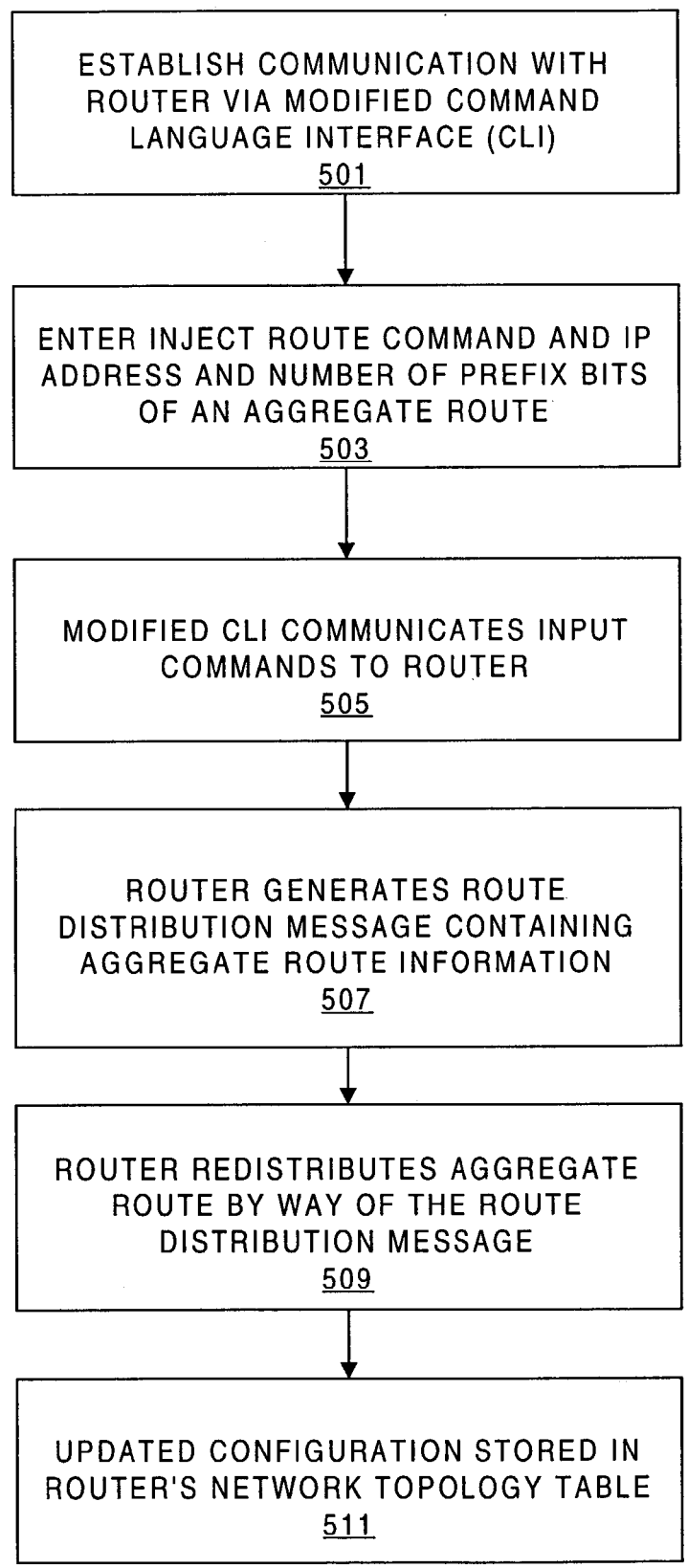
FIG. 6 is a flowchart illustrating a method of distributing routing information on an aggregate route in an IP network according to at least one embodiment of the present invention.

FIG. 6 is a flowchart illustrating a method of distributing (advertising) routing information on an aggregate route in an IP network according to an embodiment of the present invention. The method may be used, for example, to improve the availability of an aggregate route in an IP network by not requiring the provision of a next-hop address during configuration of a network device (router) advertising an aggregate route. In step 501, communication is established with a router via a modified command language interface (CLI) within the router. In an embodiment, step 501 can be executed remotely by a user via telnet or other communication methods known to those of skill in the art.

In step 503, a user begins the process of creating the static aggregate route by entering an "inject route" command and the IP address and number of prefix bits of the aggregate route, typically by means of a computer console and keyboard, to the modified CLI. The modified CLI receives the "inject route" command and the IP address and number of prefix bits of the aggregate route. The modified CLI communicates with the routing protocol process running on the router, and therefore configures the router according to commands input by the user. In step 503, the user also inputs the command specifying which routing protocol will distribute the aggregate route, for example, router OSPF [command syntax] [protocol]. It is not necessary in step 503 for the user to specify a next hop address when using the inject route command to a router employing the modified CLI.

In step 505, the modified CLI communicates the input commands (configuration information) to the routing protocol running on the router. In step 507, the routing protocol running on the router generates a route distribution message. In the various embodiments, generation of the route distribution message is accomplished with an interior gateway protocol, selected from a group consisting of OSPF, RIP, ISIS, IGRP, EIGRP, and NLSP. Examples of a route distribution message include an external link state advertisement message for OSPF, a link state packet transmission message for ISIS, and an UDP datagram update message for RIP.

In step 509, the generated route distribution message is distributed by the router. The distribution (advertising) of the aggregate route in step 509 occurs without a redistribution policy being specified. That is, no redistribution policy is needed when using the modified CLI within a router as disclosed herein. In step 511, the information regarding the aggregate route is stored in a network topology table in the router advertising the aggregate route. Should a user wish to view the result of the actions of steps 503 through 511, the most current routing information can be retrieved from the router's network topology table (route diagram).

Figure 7:
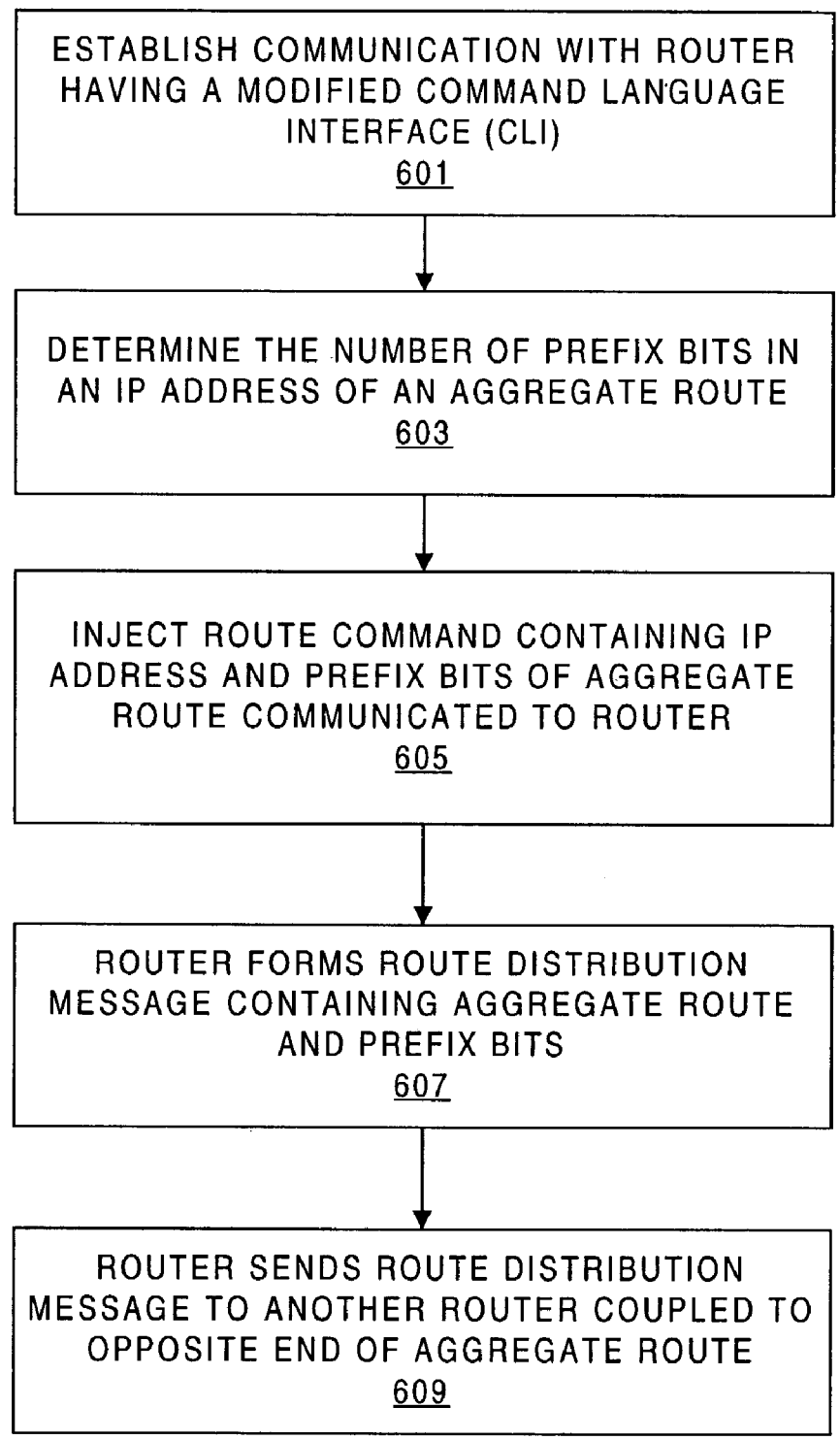
FIG. 7 is a flowchart illustrating a control sequence for a network device according to at least one embodiment of the present invention.

FIG. 7 is a flowchart illustrating a method for a control sequence for a network device in accordance with an embodiment of present invention. In step 601, communication is established with a router coupled to an internet protocol (IP) network, the router having a modified command line interface (CLI) according to an embodiment of the present disclosure. In step 603, determination of the number of prefix bits in an IP address of the aggregate route is carried out, wherein the prefix bits have values in common with all IP addresses of devices accessible via the aggregate route. In step 605, an inject route command providing the IP address of the aggregate route and the number of prefix bits to a router coupled to one end of the aggregate route and between the aggregate route and the devices is transmitted from the modified CLI to the router. Providing the IP address and the number of prefix bits can be accomplished for various interior routing protocols such as OSPF, RIP, or ISIS. No next-hop address is required in step 605 when using the modified CLI "inject route" to configure a router as taught herein.

In step 607, a routing protocol running on the router forms a route distribution message (advertisement) containing the aggregate route and the number of prefix bits. The format of the message formed in step 607 is dependent upon the routing protocol running in the router. For example, if the routing protocol is OSPF, the route distribution message will be an external link state advertisement message, while ISIS will form a link state packet transmission message, and RIP will form an UDP datagram update message. In step 609, the router sends the route distribution message to another router coupled to the opposite end of the aggregate route in the IP network.

In accordance with at least one embodiment of the present invention, the following steps describe a method for distribution of routing information for aggregate routes or for distribution of routing information for direct or aggregate routes:

Distribution of Routing Information for Aggregate Routes:
A CLI receives a command that need not include a next-hop address to create an aggregate route.
The CLI parses the command.
The CLI verifies each token in the command, which includes the following:
   Verify the IP address prefix and prefix length;
   If the IP address prefix or prefix length is not valid, the CLI returns an appropriate error message to the user.
The CLI calls to the routing stack to add the aggregate route.
The routing stack adds the aggregate route in a linked list and calls to the OSPF stack to add an AS external LSA in the OSPF's LSDB.
The OSPF stack generates an AS external LSA in its LSDB and floods the AS external LSA to all its neighbors.

Distribution of Routing Information for Direct or Aggregate Routes:
A CLI receives a command including a next-hop address to create a direct or aggregate route.
The CLI parses the command.
The CLI verifies each token in the command, which includes the following:
   Verify the destination IP address prefix, prefix length, and next-hop address;
   If the destination IP address prefix, prefix length, or next-hop address is not valid, the CLI returns an appropriate error message to the user.
The CLI calls to the routing stack to add the static route to the routing table.
The routing stack checks if the next-hop address is reachable.
   If the next-hop address is not reachable, the CLI returns an appropriate error message to the user through the CLI.
The routing stack adds the static route entry to the routing table.
The CLI receives a command to create route redistribution filtering.
The CLI parses the command.
The CLI verifies each token in the command.
The CLI calls to the routing stack to add the route map.
The routing stack stores the route map information.
The CLI receives a command to redistribute static routes into OSPF using the route map configured.
The CLI parses the command.
The CLI verifies each token in the command.
   If the specified route map does not exist, the CLI returns an appropriate error message to the user.
The CLI sends the redistribution information to the routing stack.
For each static route found in the routing table,
   If the static route matches the route map policy, the routing stack calls to the OSPF stack to add an AS external LSA in the OSPF's LSDB.
End For
The OSPF stack generates an AS external LSA in its LSDB and floods the AS external LSA to all its neighbors.

In the above steps, LSA refers to link state advertisements, which may include messages originated by an OSPF router and flooded throughout the OSPF network, which describe the local state of a router or of a network. This may include, for example, such information as the state of the router's interfaces and the adjacencies established by the router. LSDB refers to link state database, which may include collections of LSAs.

At least one embodiment of the present invention reduces the amount of operator input required to distribute aggregate routes, thereby reducing operation costs as well as the risk of errors arising from manual entry of complex routing maps and next hop addresses. In addition, because the "inject route" configuration provided by the modified CLI to a router as disclosed eliminates the requirement for specifying a next hop address, devices accessible via the aggregate route remain accessible even if one of the devices goes out-of-service. At least one embodiment of the present invention therefore improves the quality of service in an IP network by continuing to advertise aggregate routes to other routers in an IP network, hence other devices subtending from the aggregate route remain reachable.

The various functions and components described herein may be implemented using an information-handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein.

When a data processor for issuing instructions is used, the instruction may be stored in memory. Such a memory may be a single memory device or a plurality of memory devices. Such a memory device may be a read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic.

The method and apparatus herein provides for a flexible implementation. Although the invention has been described using certain specific examples, it will be apparent to those skilled in the art that the invention is not limited to these few examples. For example, the disclosure is discussed herein primarily with regard to provisioning network devices having IP and OSPF routing capabilities, the invention is applicable to IP network devices having routing capabilities using other protocols as well. Additionally, various types of routers and line cards are currently available which could be suitable for use in employing the method as taught herein. Note also, that although an embodiment of the present invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for distributing routing information pertaining to an aggregate route in an internet protocol (IP) network, comprising the steps of:
   obtaining at a first router coupled to the aggregate route and to devices accessible via the aggregate route a first number of prefix bits of an IP address of the aggregate route, the prefix bits being bits having values in common with IP addresses of the devices accessible via the aggregate route;
   forming from the prefix bits without reliance on a next-hop address a route distribution message describing the aggregate route; and
   sending the route distribution message from the first router to a second router coupled to the aggregate route.

2. The method of claim 1, wherein the step of forming comprises providing the prefix bits of the IP address and the first number of the prefix bits to an open shortest path first (OSPF) routing protocol.

3. The method of claim 2, wherein the step of forming further comprises forming an external link state advertisement (LSA) message.

4. The method of claim 1, wherein the step of forming comprises providing the prefix bits of the IP address and the first number of the prefix bits to a routing information protocol (RIP) routing protocol.

5. The method of claim 4, wherein the step of forming further comprises forming user datagram protocol (UDP) update messages.

6. The method of claim 1, wherein the step of forming comprises providing the prefix bits of the IP address and the first number of the prefix bits to an intermediate system-to-intermediate system (ISIS) routing protocol.

7. The method of claim 6, wherein the step of forming further comprises forming a link-state packet (LSP) transmission.

8. A method for improving an availability of an aggregate route in an IP network, the method comprising:
   establishing a modified command language interface to a router advertising the aggregate route;
   entering an inject route command to the router through the modified command language interface;
   generating a route distribution message from the router advertising the aggregate route; and
   distributing the aggregate route within at least a portion of the IP network coupled to the router.

9. The method of claim 8, wherein the step of generating the route distribution message is accomplished with an interior gateway protocol (IGP) operating on the router advertising the aggregate route.

10. The method of claim 9, wherein the IGP is selected from a group consisting of: open shortest path first (OSPF), routing information protocol (RIP), integrated intermediate system-to-intermediate system (ISIS), interior gateway routing protocol (IGRP), enhanced interior gateway routing protocol (EIGRP), and NetWare link services protocol (NLSP).

11. The method of claim 8, wherein the step of generating the route distribution message occurs without receiving a next-hop address from a user.

12. The method of claim 8, wherein the step of distributing the aggregate route further comprises:
   storing a network topology table in the router.

13. The method of claim 12, wherein the step of distributing the aggregate route occurs without reliance on a redistribution policy.

14. Apparatus for distributing routing information on an aggregate route in an internet protocol (IP) network, the apparatus comprising:
   a router coupled to the IP network, the router having a modified command language interface, the router comprising:
      means for obtaining a first number of prefix bits of an IP address of the aggregate route, the prefix bits having values in common with IP addresses of devices accessible via the aggregate route;

means for forming from the prefix bits without reliance on a next-hop address a route distribution message describing the aggregate route; and means for sending the route distribution message from the router to a second router coupled to the aggregate route.

15. The apparatus of claim 14 wherein the means for forming further comprises means for providing the prefix bits of the IP address and the first number of prefix bits to an open shortest path first (OSPF) routing protocol.

16. The apparatus of claim 14 wherein the means for forming further comprises means for providing the prefix bits of the IP address and the first number of prefix bits to an intermediate system-to-intermediate system (ISIS) routing protocol.

17. The apparatus of claim 14 wherein the means for forming further comprises means for providing the prefix bits of the IP address and the first number of prefix bits to a routing information protocol (RIP) routing protocol.

18. The apparatus of claim 14 wherein the means for forming a route distribution message further comprises means for forming an external link state advertisement (LSA) message.

19. The apparatus of claim 14 wherein the means for forming a route distribution message further comprises means for forming a link-state packet (LSP) transmission.

20. The apparatus of claim 14 wherein the means for forming a route distribution message further comprises means for forming a user datagram protocol (UDP) update message.

21. Apparatus for distributing routing information pertaining to an aggregate route in an internet protocol (IP) network, comprising:

a router coupled to the IP network, the router having a modified command language interface configured to obtain a first number of prefix bits of an IP address of the aggregate route, the prefix bits being bits having values in common with IP addresses of devices coupled to the router and accessible via the aggregate route, the router further having an interior gateway protocol (IGP) interface configured to form from the prefix bits without reliance on a next-hop address a route distribution message describing the aggregate route, the IGP interface further configured to send the route distribution message to at least a portion of the IP network coupled to the router.

22. The apparatus of claim 21 wherein the IGP interface comprises an open shortest path first (OSPF) interface.

23. The apparatus of claim 22 wherein the route distribution message comprises a link state advertisement (LSA) message.

24. The apparatus of claim 21 wherein the IGP interface comprises a routing information protocol (RIP) interface.

25. The apparatus of claim 24 wherein the route distribution message comprises a user datagram protocol (UDP) update message.

26. The apparatus of claim 21 wherein the IGP interface comprises an intermediate-system-to-intermediate-system (ISIS) routing protocol interface.

27. The apparatus of claim 26 wherein the route distribution message comprises a link state packet (LSP) transmission.

28. A method for distributing routing information pertaining to an aggregate route in an internet protocol (IP) network, comprising the steps of:

determining whether to form a route distribution message based on a static route defined with respect to a next-hop address; and when not forming the route distribution message based on the static route defined with respect to the next-hop address, forming, in a router, the route distribution message describing the aggregate route and communicating the route distribution message within at least a portion of the IP network.

29. The method of claim 28 wherein the step of forming the route distribution message further comprises:

forming the route distribution message from a first number of prefix bits of an IP address of the aggregate route, the prefix bits being bits having values in common with IP addresses of devices accessible via the aggregate route.

30. The method of claim 28 wherein the step of forming the route distribution message is performed according to an open shortest path first (OSPF) routing protocol.

31. The method of claim 30 wherein the step of forming the route distribution message further comprises forming a link state advertisement (LSA) message.

32. The method of claim 28 wherein the step of forming the route distribution message is performed according to a routing information protocol (RIP).

33. The method of claim 32 wherein the step of forming the route distribution message further comprises forming a user datagram protocol (UDP) update message.

34. The method of claim 28 wherein the step of forming the route distribution message is performed according to an intermediate-system-to-intermediate-system (ISIS) routing protocol.

35. The method of claim 34 wherein the step of forming the route distribution message further comprises forming a link state packet (LSP) message.

36. Apparatus for distributing routing information pertaining to an aggregate route in an internet protocol (IP) network, comprising:

a router coupled to the IP network, the router configured to determine whether to form a route distribution message based on a static route defined with respect to a next-hop address, the router further configured, when the router determines not to form the route distribution message based on the static route defined with respect to the next-hop address, to form the route distribution message describing the aggregate route and communicating the route distribution message within at least a portion of the IP network, wherein the router forms the route distribution message from a first number of prefix bits of an IP address of the aggregate route, the prefix bits being bits having values in common with IP addresses of devices accessible via the aggregate route.

37. The apparatus of claim 36 wherein the router forms the route distribution message according to an open shortest path first (OSPF) routing protocol.

38. The apparatus of claim 37 wherein the route distribution message is a link state advertisement (LSA) message.

39. The apparatus of claim 36 wherein the router forms the route distribution message according to a routing information protocol (RIP).

40. The apparatus of claim 39 wherein the route distribution message is a user datagram protocol (UDP) update message.

41. The apparatus of claim 36 wherein the router forms the route distribution message according to an intermediate-system-to-intermediate-system (ISIS) routing protocol.

42. The method of claim 41 wherein the route distribution message is a link state packet (LSP) message.

* * * * *